US005623611A

United States Patent [19]
Matsukawa et al.

[11] Patent Number: 5,623,611
[45] Date of Patent: Apr. 22, 1997

[54] DATA PROCESSING APPARATUS HAVING A BIDIRECTIONAL INTERFACE WITH RECEIVING BUFFERS, THREE-STATE BUFFERS, AND ENABLE TERMINALS FOR AUTOMATICALLY SWITCHING THE DIRECTION OF DATA TRANSMISSION AND RECEPTION

[75] Inventors: Koji Matsukawa, Nagoya; Toshiki Narukawa, Kasugai, both of Japan

[73] Assignee: Brother Kogyo Kabushiki Kaisha, Nagoya, Japan

[21] Appl. No.: 265,825

[22] Filed: Jun. 27, 1994

[30] Foreign Application Priority Data

Aug. 6, 1993 [JP] Japan .................. 5-196485

[51] Int. Cl.⁶ .................................. G06F 13/00
[52] U.S. Cl. .................. 395/309; 307/112; 307/116; 364/130; 364/148; 395/311; 395/821; 395/851; 395/858; 395/872
[58] Field of Search .................. 318/558; 370/58.1, 370/100.1; 371/22.1; 395/325, 728, 309, 311, 821, 851, 858, 872; 178/71 R; 307/112, 116; 364/130, 148, 400

[56] References Cited

U.S. PATENT DOCUMENTS

| | | |
|---|---|---|
| 3,876,983 | 4/1975 | Zafiropulo et al. .............. 340/147 SC |
| 3,967,059 | 6/1976 | Moore, III et al. .................. 178/58 A |
| 4,035,770 | 7/1977 | Sarle ................................. 340/147 R |
| 4,071,887 | 1/1978 | Daly et al. ........................... 364/200 |
| 4,127,896 | 11/1978 | Raslavsky, III .................... 364/200 |
| 4,154,978 | 5/1979 | Tu ........................................ 178/71 R |
| 4,191,941 | 3/1980 | Springer et al. ................. 340/166 R |
| 4,209,838 | 6/1980 | Alcorn, Jr. et al. ................ 364/200 |
| 4,315,167 | 2/1982 | Pelc ..................................... 307/241 |
| 4,320,508 | 3/1982 | Takezoe ................................ 371/22 |
| 4,354,267 | 10/1982 | Mori et al. ........................... 371/11 |
| 4,471,243 | 9/1984 | Isham ................................. 307/475 |
| 4,615,028 | 9/1986 | Lewis et al. .......................... 370/58 |
| 4,797,582 | 1/1989 | Nguyen et al. ..................... 307/475 |
| 4,835,418 | 5/1989 | Hsieh ................................. 307/473 |
| 4,945,297 | 7/1990 | Coustre ............................... 318/558 |
| 5,148,430 | 9/1992 | Kuranaga et al. ................ 370/100.1 |
| 5,363,494 | 11/1994 | Kudou ................................. 395/325 |
| 5,448,720 | 9/1995 | Uriu et al. ........................... 395/728 |

FOREIGN PATENT DOCUMENTS 63-209219  8/1988  Japan .

*Primary Examiner*—Thomas C. Lee
*Assistant Examiner*—Po C. Huang
*Attorney, Agent, or Firm*—Oliff & Berridge

[57] ABSTRACT

A data processing apparatus having a bidirectional interface which usually remains in a receiving mode during operation ready to receive data signals from an external device over a receiving data bus. When the apparatus is to transmit a data signal to the external device, the data signal placed on a transmitting data bus automatically causes the bidirectional interface to enter transmitting mode in preparation for the transmission.

18 Claims, 2 Drawing Sheets

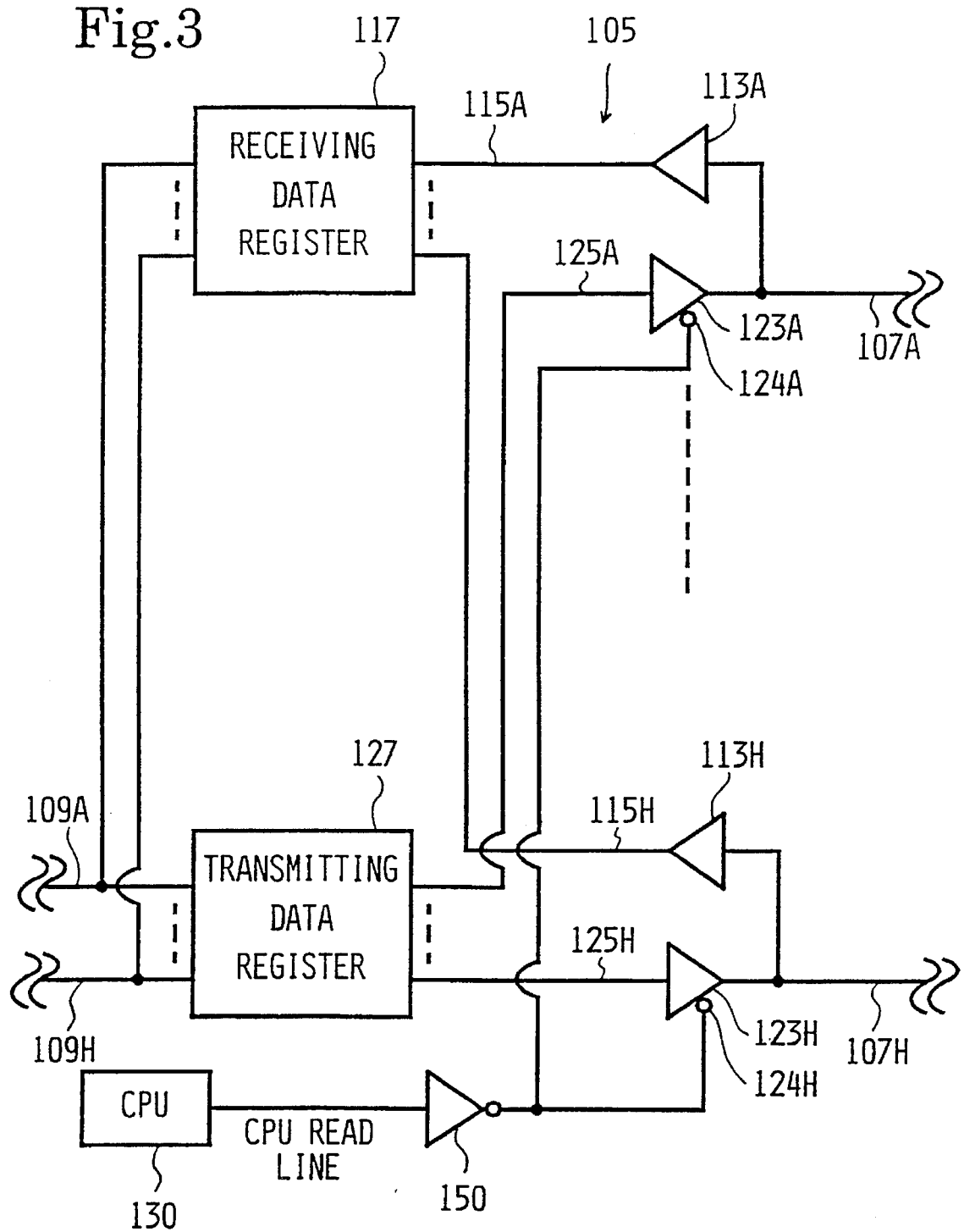

DATA PROCESSING APPARATUS HAVING A BIDIRECTIONAL INTERFACE WITH RECEIVING BUFFERS, THREE-STATE BUFFERS, AND ENABLE TERMINALS FOR AUTOMATICALLY SWITCHING THE DIRECTION OF DATA TRANSMISSION AND RECEPTION

BACKGROUND OF THE INVENTION

1. Field of the Invention

The invention relates to a data processing apparatus such as a computer, a printer or other office automation equipment. More particularly, the invention relates to an information processing apparatus having a bidirectional interface capable of transmitting and receiving data.

2. Description of the Related Art

There exist data processing apparatuses such as computers, printers and other office automation equipment having a bidirectional interface capable of transmitting and receiving data illustratively to and from an outside host computer. In operation, the conventional bidirectional interface of the above type of apparatus usually remains in receiving mode ready to receive data, e.g., from the host computer. Where the data processing apparatus is to transmit data through its bidirectional interface to the host computer, the controller of the apparatus first supplies the bidirectional interface with a special control signal. The control signal causes the bidirectional interface to leave receiving mode and enter transmitting mode for data transmission toward the host computer. The controller then starts transmitting data to the host computer via the bidirectional interface. In a bidirectional data communication setup, as outlined, the conventional bidirectional interface has a special control signal supplied thereto in order to change the direction of data transmission and reception before moving the data in the desired direction.

The fact that the conventional data processing apparatus uses the specific control signal to switch the data moving direction requires a signal line (for sending the control signal) and the CPU to provide direction switching control processing. One disadvantage of this requirement is that most conventional data processing apparatuses offer poor responsiveness in switching between the data transmitting and receiving directions. Another disadvantage is that the signal line volume and the control processing overhead tend to increase and get complicated.

SUMMARY OF THE INVENTION

It is therefore an object of the invention to overcome the above and other deficiencies and disadvantages of the prior art and to provide a data processing apparatus with improved responsiveness in easily switching the data moving direction via a bidirectional interface without the use of the conventional control signal for changing the direction of data.

In carrying out the invention and according to one aspect thereof, there is provided a data processing apparatus having a bidirectional interface capable of transmitting and receiving data signals to and from an external device, the bidirectional interface comprising: transmitting bus lines for transmitting a data signal to the external device; receiving bus lines for receiving a data signal from the external device; and switching means, connected to the transmitting and the receiving bus lines, for automatically switching the direction of data transmission and reception by use of the data signal carried by any one of the transmitting and the receiving bus lines.

In operation, the data processing apparatus according to the invention, using the switching means connected to the transmitting and receiving bus lines within the bidirectional interface, automatically switches the data moving direction on the basis of the data signal itself carried by any one of the two kinds of bus lines. The switching takes place illustratively in the following description. The data processing apparatus is usually in receiving mode ready to receive data signals from an external device via the receiving bus lines. When the apparatus outputs a data signal onto the transmitting bus lines for transmission to the external device, the data signal itself causes the switching means to switch the interface to transmitting mode. Conversely, the data processing apparatus may usually be in transmitting mode ready to transmit data signals to the external device via the transmitting bus lines. When the apparatus receives a data signal from the external device over the receiving bus lines, the received signal itself causes the switching means to switch the interface to receiving mode. That is, the data processing apparatus of the invention permits switching of the direction of data transmission and reception on a hardware basis alone. The inventive data processing apparatus switches the data moving direction on the basis of the target data signal to be transmitted or received, as opposed to conventional data apparatuses that use a direction switching control signal to make the switch before sending or receiving data. The invention boosts the responsiveness of the data processing apparatus in transmitting or receiving data in the desired direction.

These and other objects, features and advantages of the invention will become more apparent upon a reading of the following description and appended drawings.

BRIEF DESCRIPTION OF THE DRAWINGS

Preferred embodiments of the present invention will be described in detail with reference to the following figures, wherein:

FIG. 3 is a schematic block diagram of another bidirectional interface circuit in a second embodiment according to the invention.

DETAILED DESCRIPTION OF THE PREFERRED EMBODIMENT

Figure 1:
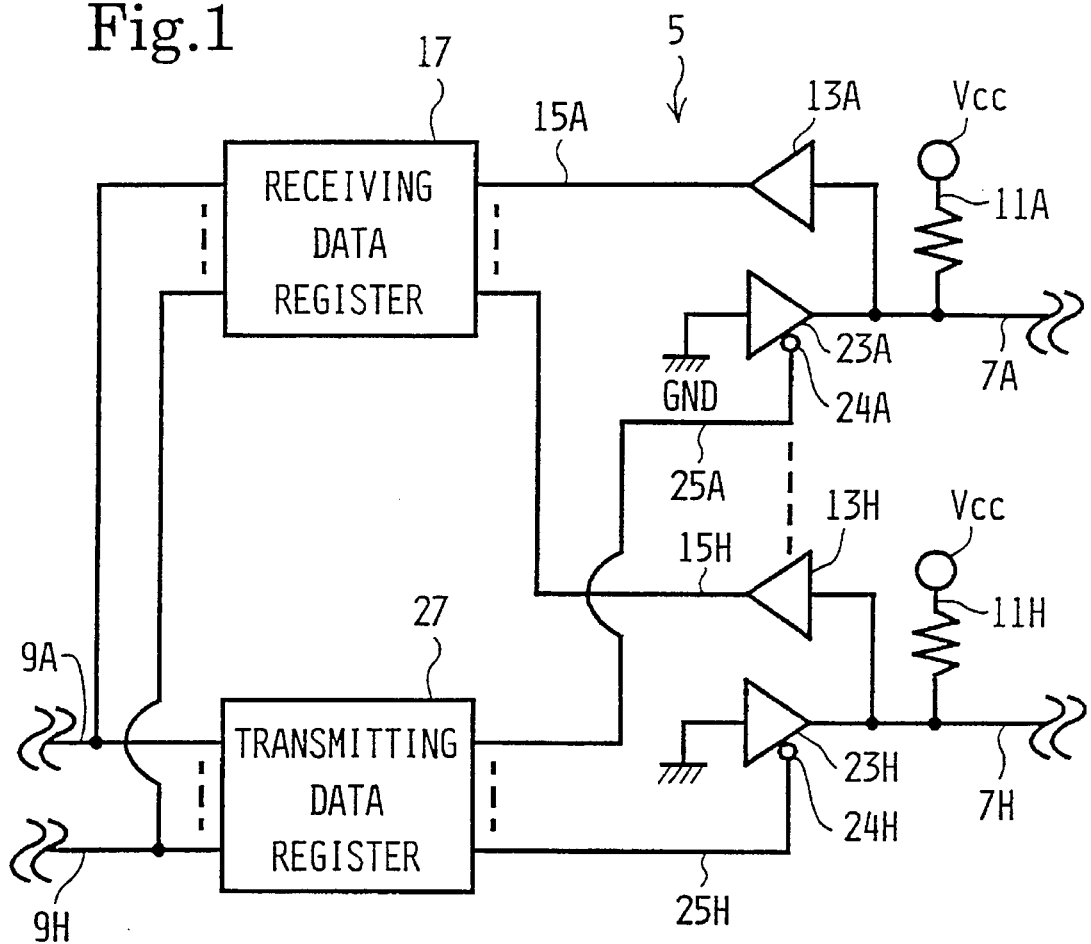
FIG. 1 is a schematic block diagram of a bidirectional interface circuit in a first embodiment according to the invention.

Preferred embodiments of the invention will now be described with reference to the accompanying drawings. First, a printer 1 is illustratively used as a data processing apparatus in a first embodiment according to the invention as will be described by referring to FIGS. 1 and 2.

The printer 1 is connected to an external host computer 3 via a bidirectional interface 5. The printer 1 and the host computer 3 exchange data with each other through the bidirectional interface 5. The bidirectional interface 5 transmits and receives data to and from the host computer 3 over a host communication data bus 7. The bidirectional interface 5 is connected via an intra-printer data bus 9 to a ROM, a RAM, and a CPU that acts as the controller of the printer 1.

These components are not of vital importance to this invention and are thus not shown in the figures.

Outlined below with reference to FIG. 1 is the circuit structure of the bidirectional interface 5 in the first embodiment as incorporated in the printer 1. As shown in FIG. 1, the bidirectional interface 5 comprises eight resistors 11A through 11H, eight receiving buffers 13A through 13H, eight receiving data bus lines 15A through 15H, a receiving data register 17, eight transmitting three-state buffers 23A through 23H, eight enable terminals 24A through 24H, eight transmitting data bus lines 25A through 25H, and a transmitting data register 27. This bidirectional interface 5 is a parallel interface that has eight units of each component part except for the receiving data register 17 and the transmitting data register 27.

The components of the bidirectional interface 5 are interconnected as follows: Host communication data bus lines 7A through 7H are connected to the input ends of the receiving buffers 13A through 13H as well as to the output ends of the transmitting three-state buffers 23A through 23H. Furthermore, the host communication data bus lines 7A through 7H are pulled up individually by the resistors 11A through 11H to which a predetermined voltage Vcc is applied.

On the data-receiving side of the bidirectional interface 5, the output ends of the receiving buffers 13A through 13H are connected to the intra-printer data bus lines 9A through 9H through the receiving data bus lines 15A through 15H and through the receiving data register 17. On the data-transmitting side of the bidirectional interface 5, the input ends of the transmitting three-state buffers 23A through 23H are connected to the ground. Furthermore, the enable terminals 24A through 24H of the transmitting three-state buffers 23A through 23H are connected to the transmitting data bus lines 25A through 25H. The transmitting data bus lines 25A through 25H are connected to the intra-printer data bus lines 9A through 9H via the transmitting data register 27.

Figure 2:
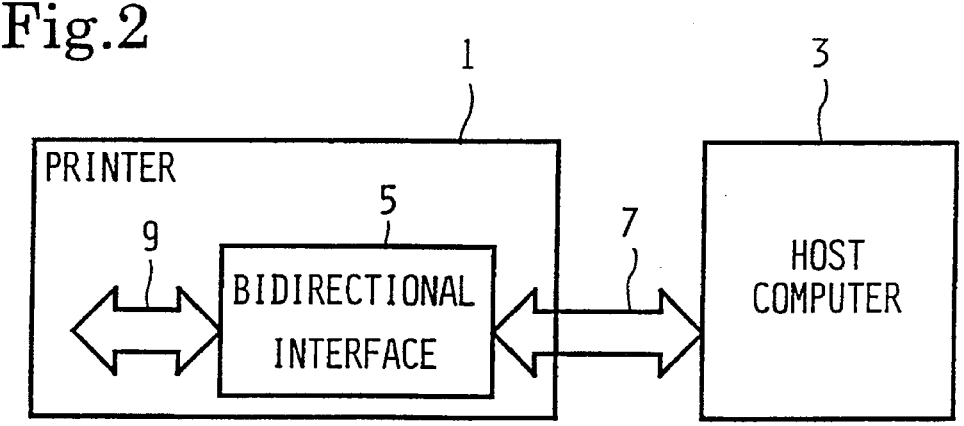
FIG. 2 is a block diagram of a printer used as a data processing apparatus to which the invention is applied.

Described below with reference to FIGS. 1 and 2 is how the bidirectional interface 5 in the first embodiment of the invention works in conjunction with the printer 1.

The data received from the host computer 3 into the bidirectional interface 5 via the host communication data bus lines 7A through 7H is either at the High level (hereinafter referred to as "H") or at the Low level (hereinafter referred to as "L"). The data admitted into the bidirectional interface 5 is forwarded past the receiving buffers 13A through 13H and output unmodified as either H or L data. In other words, when H data is received into the receiving buffers 13A through 13H, the receiving buffers 13A through 13H output the H data as received; when L data is received into the receiving buffers 13A through 13H, the buffers 13A through 13H output the L data as received. The data output from the receiving buffers 13A through 13H is placed into the receiving data register 17 by way of the receiving data bus lines 15A through 15H. The received data held in the receiving data register 17 is transmitted over intra-printer data bus lines 9A through 9H into controller, not shown.

The data to be transmitted is sent from the controller over the intra-printer data bus lines 9A through 9H into the transmitting data register 27. The data is then output from the transmitting data register 27 for transmission from the printer 1 to the host computer 3. The data having been output from the transmitting data register 27 reaches the enable terminals 24A through 24H of the transmitting three-state buffers 23A through 23H via the transmitting data bus lines 25A through 25H.

Since the input ends of the transmitting three-state buffers 23A through 23H are connected to the ground, as noted above, these input ends are fixed to L. Thus, if the data having reached the enable terminals 24A through 24H via the transmitting data bus lines 25A through 25H is L data, the output ends of the transmitting three-state buffers 23A through 23H produce what was previously input to the transmitting three-state buffers 23A through 23H. That is, the buffer output is at L.

If the data having reached the enable terminals 24A through 24H is H data, the output ends of the transmitting three-state buffers 23A through 23H are disconnected from the input ends (i.e., from the ground). This places the output from the transmitting three-state buffers 23A through 23H in the high impedance state. On the output side, as mentioned above, the host communication data bus lines 7A through 7H are being pulled up individually by the resistors 11A through 11H to which the predetermined voltage Vcc is applied. Thus, the output to the host computer 3 via the host communication data bus lines 7A through 7H is at H.

As described, the bidirectional interface 5 in the first embodiment is usually in receiving mode ready to receive data signals from the host computer 3 to the printer 1 over the receiving data bus lines 15A through 15H. When the printer 1 is to transmit data to the host computer 3, the target data placed onto the transmitting data bus lines 25A through 25H switches the bidirectional interface 5 to transmitting mode. Unlike conventional bidirectional interfaces, there is no need to use special control signals for switching the direction of data transmission and reception; the direction is switched automatically in the bidirectional interface 5 on a hardware basis alone. The embodiment thus switches the data moving direction on the basis of the target data signal to be transmitted or received, as opposed to conventional data apparatuses that use direction switching control signals to make the switch before sending or receiving data. The invention boosts the responsiveness of the data processing apparatus in transmitting or receiving data in the desired direction.

Although the bidirectional interface 5 in the first embodiment according to the invention contains many specificities, these should not be construed as limiting the scope of this invention but as merely providing illustrations of the invention.

For example, the above bidirectional interface 5 in the first embodiment normally remains in receiving mode during operation ready to receive data from the host computer 3 into the printer 1; an output signal switches the bidirectional interface 5 to transmitting mode for data transmission from the printer 1 to the host computer 3. Alternatively, the bidirectional interface 5 may normally remain in transmitting mode during operation ready to transmit data from the printer 1 to the host computer 3. In the alternative case, a signal received may be arranged to switch the bidirectional interface 5 to receiving mode for data transfer from the host computer 3 to the printer 1.

With the first embodiment above, the target signal to be transmitted causes the bidirectional interface 5 to switch the direction of data transmission and reception. Alternatively, the CPU of the printer 1 may output a read signal for switching the data moving direction. This alternative scheme is implemented illustratively using the circuit structure of FIG. 3 as the second embodiment.

A bidirectional interface 105 of FIG. 3, as with its counterpart of FIG. 1, comprises eight receiving buffers 113A through 113H, eight receiving data bus lines 115A through 115H, a receiving data register 117, eight transmitting three-state buffers 123A through 123H, eight enable terminals 124A through 124H, eight transmitting data bus lines 125A through 125H, and a transmitting data register 127. Whereas the structure of FIG. 1 has the input ends of the transmitting three-state buffers 23A through 23H connected to the ground, the bidirectional interface 105 in the second embodiment has the input ends of the transmitting three-state buffers 123A through 123H connected to the transmitting data register 127. The eight resistors 11A through 11H of the first embodiment are not included in the second embodiment because the host communication data bus lines 107A through 107H of the second embodiment need not be pulled up by these resistors.

The enable terminals 124A through 124H of the transmitting three-state buffers 123A through 123H are connected to a lead wire which in turn is connected via an inverter 150 to a CPU 130 inside the printer 1. A read signal output by the CPU 130 is sent through the inverter 150 to the enable terminals 124A through 124H of the transmitting three-state buffers 123A through 123H.

How the bidirectional interface 105 works in the second embodiment will now be described. When no read signal comes from the CPU 130, the control input (i.e., an inverted signal of the CPU read signal) to the enable terminals 124A through 124H of the transmitting three-state buffers 123A through 123H is at H. The target data to be transmitted is placed in the transmitting data register 127. For data transmission, the target data is output as desired over the transmitting data bus lines 125A through 125H. Thus, the bidirectional interface 105 in the second embodiment usually remains in a transmitting mode ready to transmit data from the printer 1 to the host computer 3.

When data from the host computer 3 is received into the receiving data register 117, the CPU 130 outputs a read signal (at H) so as to fetch the data from the receiving data register 117. The output of the read signal brings L the control input (i.e., an inverted signal of the read signal) to the enable terminals 124A through 124H of the transmitting three-state buffers 123A through 123H. This triggers a disconnection from the transmitting data register 127 that serves as the input side. The bidirectional interface 105 is now switched to receiving mode ready to receive data from the host computer 3. The data received via the host communication data bus lines 107A through 107H is placed unmodified into the receiving data register 117 through the receiving buffers 113A through 113H and the receiving data bus lines 115A through 115H. The received data is then read into the controller via the intra-printer data bus lines 109A through 109H.

The conventional bidirectional interface has the data direction switching control signal (i.e., enable signal) supplied thereto in order to switch from receiving mode to transmitting mode, and vice versa. When the switchover is verified, a read signal or the like is issued to fetch the data and carry out related operations. This makes it necessary to perform suitable control processing regarding the signal line (for sending the control signal) and the CPU in switching the data moving direction. Working in this manner, the conventional bidirectional interface offers a poor responsiveness in switching the direction of data transmission and reception. Further, the signal line volume and the control processing tend to increase and get complicated. In contrast, the bidirectional interface in the second embodiment needs a separate signal line but is capable of fetching the received data from the host computer 3 with little wait time the moment the CPU 130 outputs a read signal. The second embodiment thus provides significantly higher responsiveness than its conventional counterpart which uses the data direction switching control signal for switching between transmission and reception.

As many apparently different embodiments of this invention may be made without departing from the spirit and scope thereof, it is to be understood that the invention is not limited to the specific embodiments thereof except as defined in the appended claims.

What is claimed is:

1. A data processing apparatus having a bidirectional interface capable of transmitting and receiving data signals to and from an external device, said bidirectional interface comprising:

a plurality of transmitting bus lines for transmitting a data signal to the external device;

a plurality of receiving bus lines for receiving a data signal from the external device; and switching means, connected to said transmitting and said receiving bus lines, for automatically switching the direction of data transmission and reception by use of the data signal carried by any one of said transmitting and said receiving bus lines, wherein said switching means is normally in a receiving mode for receiving data signals from the external device and comprises:

a plurality of receiving buffers, a receiving buffer connected to each one of said plurality of receiving bus lines at an output side and to an external device communication data bus line at an input side;

a plurality of three-state buffers, each three state buffer connected to a transmitting bus line at an input side and one of said external device communication data bus lines at an output side; and a plurality of enable terminals, one enable terminal associated with each transmitting bus line and connected to one of said three-state buffers.

2. The data processing apparatus of claim 1, further comprising a receiving data register connected to said receiving buffers via said receiving bus lines.

3. The data processing apparatus of claim 2, further comprising a plurality of intra-printer data bus lines connected to an output side of said receiving data register.

4. The data processing apparatus of claim 3, further comprising a transmitting data register connected at an input side to said plurality of intra-printer data bus lines and at an output side to said plurality of transmitting bus lines.

5. The data processing apparatus of claim 1, said switching means further comprising a plurality of resistors, a resistor connected to each external device communication data bus line.

6. A data processing apparatus having a bidirectional interface capable of transmitting and receiving data signals to and from an external device, said bidirectional interface comprising:

a plurality of transmitting bus lines for transmitting a data signal to the external device;

a plurality of receiving bus lines for receiving a data signal from the external device; and switching means, connected to said transmitting and said receiving bus lines, for automatically switching the direction of data transmission and reception by use of the data signal carried by any one of said transmitting and said receiving bus lines, wherein said switching means is normally in a transmitting mode for transmitting data signals to the external device and comprises:

a plurality of receiving buffers, a receiving buffer connected to each one of said plurality of receiving bus lines at an output side and to an external device communication data bus line at an input side;

plurality of three-state buffers, each three-state buffer connected to a transmitting bus line at an input side and one of said external device communication data bus lines at an output side; and a plurality of enable terminals, one enable terminal associated with each transmitting bus line and connected to one of said three-state buffers.

7. The data processing apparatus of claim 6, further comprising a receiving data register connected at an input side to said receiving buffers via said receiving bus lines.

8. The data processing apparatus of claim 7, further comprising:

a plurality of intra-printer data base lines; and a transmitting data register, wherein said plurality of intra-printer data bus lines are connected to an output side of said receiving data register and to an input side of said transmitting data register, said transmitting data register connected at an output side to said plurality of transmitting bus lines.

9. The data processing apparatus of claim 6, wherein said switching means further comprises an inverter for receiving a signal from a CPU at an input side, said inverter connected at an output side to said plurality of three-state buffers.

10. A data processing apparatus having a bidirectional interface capable of transmitting and receiving data signals to and from an external device, said bidirectional interface comprising:

a plurality of transmitting bus lines for transmitting a data signal to the external device;

a plurality of receiving bus lines for receiving a data signal from the external device; and switching means for automatically switching the direction of data transmission and reception by use of the data signal carried by any one of said transmitting and said receiving bus lines, said switching means comprising:

a plurality of receiving buffers, a receiving buffer connected to each one of said plurality of receiving bus lines at an output side and to an external device communication data bus line at an input side;

a plurality of three-state buffers, each three-state buffer connected to a ground at an input side and one of said external device communication data bus lines at an output side; and a plurality of enable terminals, one enable terminal associated with each transmitting bus line and connected to one of said plurality of three-state buffers.

11. The data processing apparatus of claim 10, further comprising a receiving data register connected to said receiving buffers via said receiving bus lines.

12. The data processing apparatus of claim 11, further comprising a plurality of intra-printer data bus lines connected to an output side of said receiving data register.

13. The data processing apparatus of claim 12, further comprising a transmitting data register connected at an input side to said plurality of intra-printer data bus lines and at an output side to said plurality of transmitting bus lines.

14. The data processing apparatus of claim 10, said switching means further comprising a plurality of resistors, a resistor connected to each external device communication data bus line.

15. A data processing apparatus having a bidirectional interface capable of transmitting and receiving data signals to and from an external device, said bidirectional interface comprising:

a plurality of transmitting bus lines for transmitting a data signal to the external device;

a plurality of receiving bus lines for receiving a data signal from the external device; and switching means for automatically switching the direction of data transmission and reception by use of the data signal carried by any one of said transmitting and said receiving bus lines, said switching means comprising:

a plurality of receiving buffers, a receiving buffer connected to each one of said plurality of receiving bus lines at an output side and to an external device communication data bus line at an input side;

a plurality of three-state buffers, each three-state buffer connected to an transmitting bus line at an input side and one of said external device communication data bus lines at an output side; and a plurality of enable terminals, one enable terminal associated with each transmitting bus line and connected to one of said three-state buffers.

16. The data processing apparatus of claim 15, further comprising a receiving data register connected at an input side to said receiving buffers via said receiving bus lines.

17. The data processing apparatus of claim 16, further comprising:

a plurality of intra-printer data base lines; and a transmitting data register, wherein said plurality of intra-printer data bus lines are connected to an output side of said receiving data register and to an input side of said transmitting data register, said transmitting data register connected at an output side to said plurality of transmitting bus lines.

18. The data processing apparatus of claim 15 wherein said switching means further comprises an inverter for receiving a signal from a CPU at an input side, said inverter connected at an output side to said plurality of three-state buffers.

* * * * *